358-84. OR 3,188,384 SR

SEARCH ROOM

June 8, 1965 C. L. TOWNSEND 3,188,384

SIGNAL DISTRIBUTION SYSTEM INCLUDING AN INTERROGATION SIGNAL CHANNEL CONNECTED SERIALLY BETWEEN SUBSCRIBER STATIONS

Filed March 31, 1961 4 Sheets-Sheet 1

T5027 Rm

INVENTOR
CHARLES L. TOWNSEND
BY
Pennie, Edmonds, Morton, Barrows & Taylor
ATTORNEYS June 8, 1965 C. L. TOWNSEND 3,188,384

SIGNAL DISTRIBUTION SYSTEM INCLUDING AN INTERROGATION SIGNAL CHANNEL CONNECTED SERIALLY BETWEEN SUBSCRIBER STATIONS

Filed March 31, 1961 4 Sheets-Sheet 2

INVENTOR
CHARLES L. TOWNSEND

BY
Pennie, Edmonds, Morton, Barrows & Taylor
ATTORNEYS

INVENTOR
CHARLES L. TOWNSEND
BY
Pennie Edmonds Morton Barrows & Taylor
ATTORNEYS INVENTOR
CHARLES L. TOWNSEND
BY
Pennie, Edmonds, Morton, Barrows & Taylor
ATTORNEYS 3,188,384

SIGNAL DISTRIBUTION SYSTEM INCLUDING AN INTERROGATION SIGNAL CHANNEL CONNECTED SERIALLY BETWEEN SUBSCRIBER STATIONS

Charles L. Townsend, Dumont, N.J., assignor to Teleprompter Corporation, New York, N.Y., a corporation of New York Filed Mar. 31, 1961, Ser. No. 99,889
7 Claims. (Cl. 178—6)

This invention relates to signal distribution and more particularly to the distribution of television signals over a network of transmission lines extending from a central control station to a plurality of subscriber's stations. The invention provides a signal distribution system which permits individual subscribers to elect whether to receive particular programs or not, which permits their elective participation in distributed programs as by answering questions put to them, and which permits control and recording at a central station of such reception and participation.

This invention is an improvement over that disclosed in the copending application of Hubert J. Schlafly, Serial No. 37251, filed June 20, 1960, assigned to the assignee hereof. The present invention in particular provides by electrical means rapid recording at a central office of the status of the subscriber's stations.

The invention will now be described in further detail by reference to the accompanying drawings in which FIG. 1 is a diagram of the central office equipment;

FIGS. 1, 2 and 3 are to be assembled in a row with FIG. 2 to the left of FIG. 1 and FIG. 3 to the left of FIG. 2.

Figure 1:
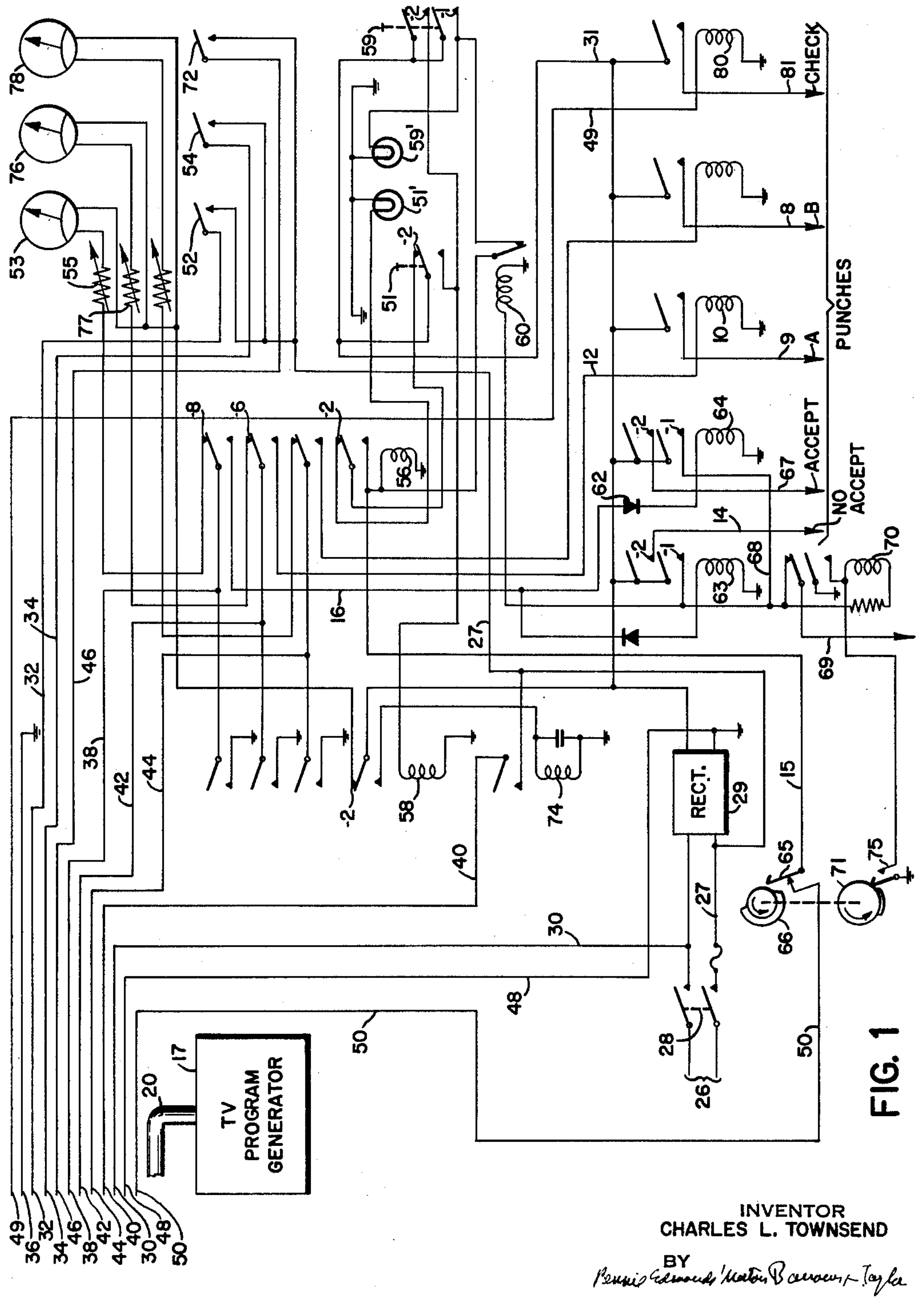

Reference characters from 1 to 100 and from 101 to 200 will be employed to identify elements of structure at the central and subscriber's stations respectively.

Figure 2:
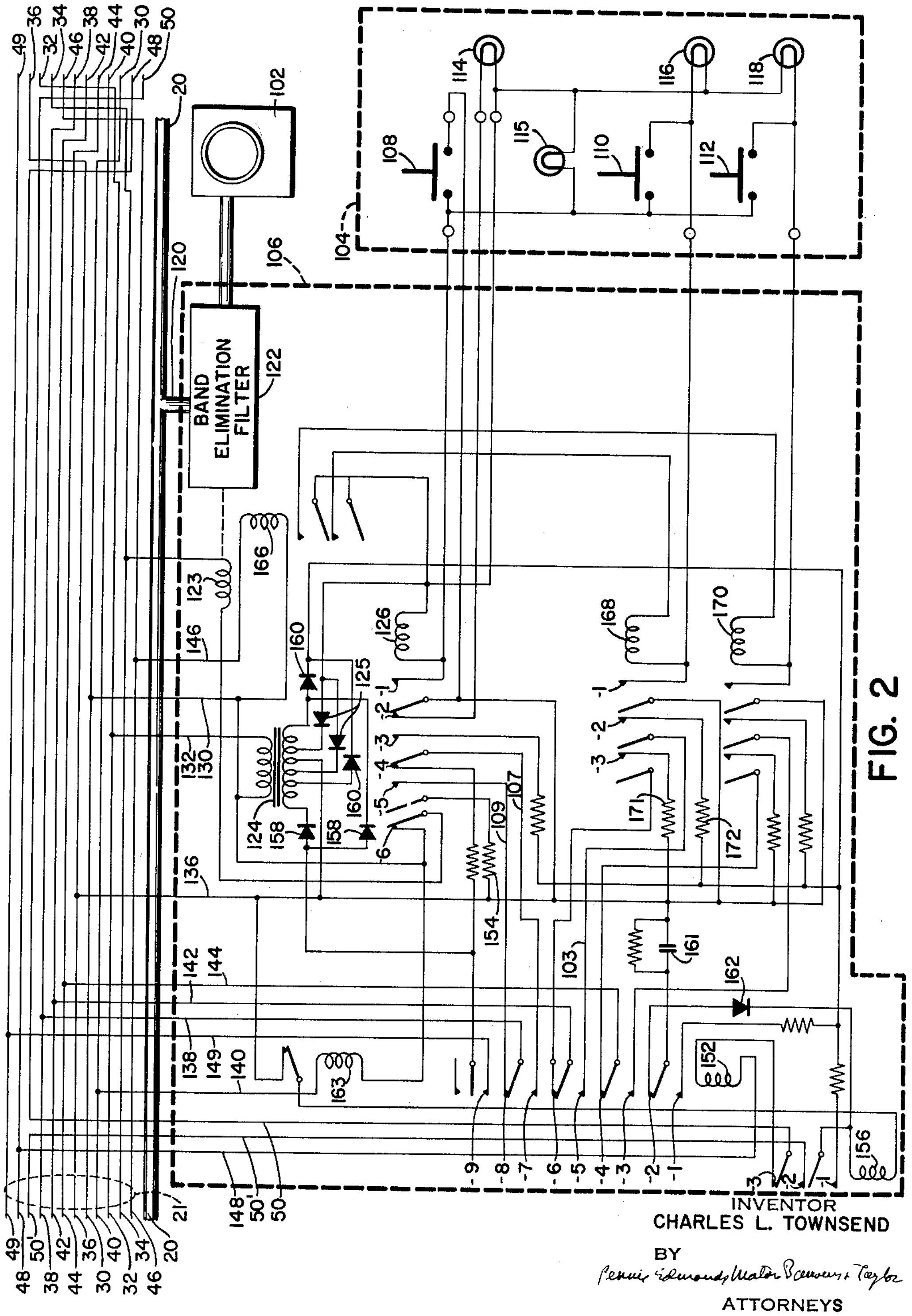
FIG. 2 is a diagram of a subscriber's station.

Referring to FIG. 2, a television receiver is indicated at 102 and a subscriber's control box is indicated at the dash-line box 104. Dash-line box 106 in FIG. 2 identifies the remainder of the subscriber's station which may conveniently be housed in a location inaccessible to the subscriber himself but accessible to employees of the program distributor. The dash-line box 106 may be referred to as a pole box in view of possible mounting of the components shown therein in a weather-tight container on a utility pole.

The viewer's control box includes an accept switch 108 and, in the installation being described two interrogation-response switches 110 and 112. In addition, it includes a subscription program indicator lamp 114, an accepted subscription program lamp 115, and interrogation-response lamps 116 and 118.

The television signals distributed by the system of the invention originate in a television program generator 17 at the central station of FIG 1. This generator may include a high quality television receiver intended to capture and amplify wireless television signals from distant stations, or television signals furnished to the central station over a transmission line. It may also, or alternatively include a film scanner or other means of developing television signals from a record such as film or magnetic tape. From generator 17 the television signals are distributed to the subscriber's stations over a transmission line 20, shown as a coaxial cable, from which a branch 120 is provided for each subscriber.

At each subscriber's station, of which one is shown in FIG. 2, the cable 120 passes through the pole box 106 and thence into the television receiver 102. The cable 20 and its branches are capable of transmitting the complete television signal on one and preferably in each of a plurality of distinct frequency channels. Within the pole box 106 the line 120 is provided with a band elimination filter 122. The filter 122 may comprise merely passive elements insertable upon energization of a relay 123 to provide heavy attenuation over one video channel. Alternatively, or additionally, it may include a noise oscillator likewise activated upon energization of the relay 123 to generate signals which will prevent reception on that channel at the subscriber's receiver 102.

The central office is connected to each subscriber's station not only by the coaxial cable 20 but by means of a plurality of control conductors which may be formed into a cable 21. At each subscriber's station branch conductors from cable 21 enter the pole box. These branch conductors are identified by the reference characters, increased by one hundred, of the corresponding conductors in cable 21. Together the control conductors permit activation at all subscriber's premises of the band elimination filter 122, deactivation thereof by the subscribers individually, and recording at the central office for each subscriber of such deactivation and of each subscriber's responses, if any, to questions addressed to him over a television channel which may or may not be the one to which the filter 122 applies. In addition, the control conductors permit instantaneous estimates of the number of subscribers who have "accepted" a program and of those giving one or another response to such questions. Typically an installation according to the invention will include a large number, of the order of hundreds or thousands, of subscribers' stations similar to the one shown in FIG. 2. A second subscriber's station is shown at the dash-line box 100 in FIG. 3, containing a television receiver 102, a subscriber's control box 104, and a pole box 106.

At the central station a power source is shown at 26 in the form of a two-conductor 110 volt 60 cycle line, although the invention is obviously not limited thereto. Line 26 is connected through a switch 28 to a rectifier 29 which provides between a conductor 31 and central station chassis ground a direct current voltage for the performance of various control functions presently to be described. One side of line 26 connects to an A.C. "neutral" conductor 30 in cable 21 and the other side 27 connects with a "standby" conductor 32 in cable 21 through a "standby" switch 52 for energization at the subscriber's station of a transformer connected between branches 130 and 132. The switch 52 is closed when it is desired either to present a "subscription" television program, i.e. subject to acceptance by the subscribers, or to provide for interrogation of the subscribers, or for both purposes. The operation of the system for the presentation of a subscription television program will be first described.

When transformer 124 is energized by closing of switch 52 (it will be so energized at all subscriber's stations), lamp 114 will be illuminated through a low voltage direct current circuit developed at rectifiers 125 from the secondary of transformer 124. This circuit is completed through normally closed contacts 126–2 of a relay 126. Illumination of lamp 114 advises the subscriber of the imminence of a subscription program, or of a program, whether requiring acceptance or not, including questions to be put to the viewers.

When the subscription program is to begin a switch 54 at the central office is closed, connecting the 110 volt conductor 27 to a system conductor 34 in cable 21. A circuit for energization of the relay 123 controlling band elimination filter 122 is thereby completed through a pair of normally closed contacts 126–6 on relay 126. Relay 126 being deenergized, closing of switch 54 at the central office makes effective the band elimination filter 122 and blocks passage to the receiver 102 at all subscriber's stations of the program over the channel in which filter 122 is effective.

If the subscriber desires to receive this program, he closes momentarily his "accept" switch 108, thus energizing relay 126 from the same source as that used for lamp 114. Normally open contacts 126–1 now closed provide a holding circuit for this relay. Opening of normally closed contacts 126–6 deenergizes the relay 123 which actuates band elimination filters 122, and passage of the subscription program through the cable 120 to the subscriber's television receiver is accordingly permitted. This condition is indicated by lighting of lamp 115 through contacts 126–1. Opening of normally closed contacts 126–2 breaks the circuit for lamp 114, which is thereupon extinguished.

At the central station a current meter 53 is provided in series with a calibrating resistor 55 between the positive D.C. conductor 31 and an "accept" conductor 38 of cable 21 via the normally closed contacts 56–8 of a central office relay 56 and via similar contacts 58–2 on another central office relay 58. Conductor 38 passes via its branch 138 in the subscriber's premises through the normally closed contacts 152–8 of a relay 152 to normally open contacts 126–5 on relay 126. Relay 126 being energized contacts 126–5 are now closed and a resistor 154 at the subscriber's station is connected as a load between conductor 38 and a D.C. "reply common" conductor 36 in cable 21 which leads at the central station to the chassis ground, constituting the terminal of the D.C. output circuit of rectifier 29 opposite conductor 31. The current indication on meter 53 is the sum of the currents through the resistors 154 at all subscriber's stations where relay 126 is energized. It is therefore an indication of the number of subscribers who have operated their accept switches 108 and who have therefore contracted to pay for the subscription program.

In order to record at the central office the fact of operation of the accept switches at the subscribers' premises for billing and other purposes, the invention provides means whereby the subscriber's stations may be "interrogated" in rapid succession, with recording at the central station of the status of relay 126 at each subscriber's station. To this end the central station includes recording apparatus, which may take the form of a conventional tape punching device, in which a record tape is advanceable through a specified interval for each subscriber, and in which means are provided to punch the tap for every subscriber whose relay 126 has been energized. The relays 126, once energized, can be deenergized only from the central station. The condition of relay 126 for each subscriber's station is tested by connecting the accept branch conductor 138 at the various subscriber's stations successively and individually to a two-polarity circuit individual to the subscriber's station and controlled by relay 126. The resulting polarity of conductor 38 effects at the central station a punch or no-punch operation (or alternatively a distinguishable "non-accept" punch operation). The successive individual connection of the conductor 38 into this circuit at each subscriber's station is effected by means of a "step" conductor 50, energized at the central station over for each cycle of the tape advancing mechanism. The conductor 50 leads without branches into the first subscriber's station where it serves, via a relay 152 which it controls, to connect the branch 138 of the accept conductor to the two-polarity circuit. One or the other polarity is accordingly applied to conductor 38, which at the central station initiates advance of the tape record medium and also the appropriate punching operation. The tape advance mechanism which is set into motion then deenergizes the step conductor 50 outgoing from the central station. Relay 152 at the first subscriber's station accordingly deenergizes, disconnecting the branch 138 there from the two-polarity circuit at that station. A further circuit, energized upon deenergization of relay 152, now effects connection of the incoming step line to the outgoing step line at the first subscriber's station, which outgoing step line leads as the incoming step line into the next subscriber's station. At the close of the tape advance and punch cycle at the central station, the step conductor there is energized anew, so that the entire cycle is repeated at the second subscriber's station, and so on, until all have been interrogated.

At the end of the interrogation process a "cueue" release conductor in the central cable is energized, and its branches at the separate subscriber's stations break, at each such station, the junction between adjacent incoming and ougtoing portions of the step conductor. In this way the chain for interrogation is broken, and a further recording if undertaken begins again at the first subscriber's station. At the end (and also at the beginning) of the recording process, the accept conductor 38 is grounded at the central station by operation of a relay 58 in order to discharge the capacity of the accept conductor and its branches.

The foregoing process will now be described in further detail in terms of the particular embodiment illustrated in the drawings.

The system is shifted between the "reading" operation, in which meter 53 indicates the number of subscribers who have accepted a subscription program, and the "recording" operation just outlined by means including a relay 56 at the central station. In the embodiment illustrated, relay 56 is controlled by a "read" switch 51 and a "record" switch 59. These are spring-loaded to the positions shown in FIG. 1, and operation of either switch shifts relay 56 to the condition in which the system performs the function associated with the name of that switch.

If of switches 51 and 59 switch 51 was last operated, the system will find itself in the "read" condition, to which corresponds the deenergized condition of relay 56 shown in FIG. 1. This is signalized by lighting of a "read" lamp 51′ via the normally closed –2 contacts of switch 51 and of relay 56. It will be observed that conductor 38 leads to meter 53 through the closed –8 contacts of relay 56.

To initiate a recording, switch 59 is momentarily operated to close its contacts. Its contacts energize relay 56 via the closed contacts of a relay 60 now deenergized. Relay 56 latches in energized condition at its now closed –1 contacts with power supplied through the closed –2 contacts of switch 51. Conductor 38 is disconnected from meter 53 at the now open –8 contacts of relay 56.

At the –2 contacts of switch 59 relay 58 is briefly energized. This grounds conductor 38 at the –5 contacts of that relay. It also briefly energizes a relay 74, at the –1 contacts of relay 58 now closed. The contacts of relay 74 close, applying A.C. power to the "cueue release" conductor 40. This energizes a relay 163 in each subscriber's station in order to break the circuit for relay 156, which in energized condition converts at its –2 contacts the incoming step line (shown at 50 in the subscriber's station of FIG. 2) with the outgoing step line (shown at 50′ in FIG. 2 and which constitutes the incoming step line to the next subscriber's station 100 in FIG. 3). Relays 58 and 74 both return to deenergized condition within a time of the order of seconds or less, in accordance with their time constants, so that conductor 38 is again insulated from ground and, in the subscriber's stations the relays 163 are deenergized, with their contacts closed.

The recording process thus begins by connection of conductor 38 to a conductor 16 at now-closed –7 contacts of relay 56 and thence, through oppositely poled rectifiers 61 and 62 to the actuating coils of two relays 63 and 64. Neither of these relays is actuated from the mere energization of relay 56, since at all subscriber's stations the accept conductor 38 and its branches 138 are through closed contacts 152–8 either open-circuited at the open contacts 126–5, at subscriber's stations where the switch 108 has not been closed, or else grounded through closed contacts 126–5 and resistor 154 to the common conductor 36 via its branches 136, at subscriber's stations where switch 108 has been closed.

Closing of record switch 59 and the resultant energization of relay 56 also applies positive D.C. potential, via a conductor 15 and the normally closed contacts of a switch 65 operated by a cam 66, to the "step" conductor 50 in cable 21. This conductor leads without branches into a first subscriber's station and there to the movable element of normally closed contacts 156–3 of the subscriber's relay 156. Through these contacts relay 152 at that subscriber's station is energized. The end of the actuating coil of each relay 152 is returned to D.C. ground at the central station through a "step common" return conductor 48 provided in cable 21 in order to avoid cross-talk between the stepping function and accept function whose voltages lie between the accept conductor 38 and common conductor 36.

Energization of relay 152 transfers the connection of the "accept" conductor 138 in this subscriber's station to the movable element of contacts 126–3 and 126–4. If switch 108 has not been operated at this subscriber's station, conductor 138 receives a negative voltage of contacts 126–4 from negatively poled rectifiers 158 on the secondary of transformer 136. Conversely, if switch 108 has been operated, conductor 138 receives a positive voltage at contacts 126–3, the stationary one thereof receiving a positive voltage from positive rectifiers 160, also energized from the secondary of transformer 136.

A positive potential on conductor 138 accordingly signifies operation of the accept switch at the subscriber's station in which the step conductor has currently energized relay 152. This positive potential, passing through rectifier 62, actuates relay 64. Closing of its contact 64–2 connects positive conductor 31 with a conductor 67, which actuates a punching solenoid, not shown, to record acceptance of the program on a punched record strip on which one lengthwise position is allocated to each subscriber. At contact 64–1 positive potential is also applied via a conductor 68 to relay 60. Energization of relay 60 breaks the circuit by which power is fed to a lamp 59′. This lamp thus blinks off once for each subscriber's station interrogated, giving to the operator at the central station an indication that the recording process is in operation. When this lamp goes out, the last subscriber's station has been interrogated and its acceptance or non-acceptance of the program has been recorded.

If instead switch 108 has not been closed at the subscriber's station whose condition is being recorded, relay 63 will be energized in place of relay 64, and conductor 31 will be connected at contacts 63–1 to conductor 68, energizing relay 60. In addition, at contact 63–2, power is applied to a conductor 14 which like conductor 67 actuates a punching solenoid, not shown, to punch in the record tape at a distinct position crosswise thereon a perforation indicative of non-acceptance of the program by the particular subscriber's station being interrogated.

In this event, there results extension of the positive voltage on conductor 31 to conductor 68, which energizes not only relay 60 but also, via normally closed contacts 70–2 of a relay 70 and a conductor 69, the solenoid of a clutch in a tape advance mechanism (not shown) to which are coupled the cam 66 and a second cam 71.

In one known form of apparatus which may be employed for the tape advance and punching functions, the solenoid (not shown) operated on energization of conductor 69 withdraws a mechanical latch. This latch, until so withdrawn, prevents engagement between a continuously rotating shaft and a sleeve coaxial therewith. With the latch so withdrawn the sleeve is driven by the shaft through one revolution, the latch being released by deenergization of conductor 69 before the sleeve has completed one revolution. At the end of one revolution the sleeve is therefore brought to a halt again. This sleeve drives the tape advance rolls or sprocket wheels and the actual accept or no-accept punch pin, whichever one has been armed by energization of conductor 67 or 14. It also rotates each of cams 66 and 71 through one revolution.

If energization of conductor 68 comes about through operation of relay 64, there will be made via conductor 67 a punch in the "accept" column of the tape in a portion thereof allocated to the subscriber whose relay 152 is currently energized, recording his acceptance of the program. If it comes about through operation of relay 63, there will be no punch in the accept column for this subscriber and a punch in the "no-accept" column instead.

With conductor 69 once energized, rotation of cams 66 and 71 is initiated as above stated. Cam 71 shortly closes, for a fraction of a revolution, a normally open switch 75. This completes a circuit from conductor 68 to ground through the actuating coil of relay 70. Relay 70 is latched in energized condition on its –1 contacts until conductor 68 deenergizes, upon the deenergization of relay 152 in the subscriber's station being interrogated. At its –2 contacts relay 70 opens the circuit to conductor 69 and deenergizes the solenoid of the clutch already referred to, ensuring that for each subscriber's station the tape advance mechanism advances the tape only one step.

Cam 66 shortly opens its associated switch 65, likewise for a fraction of a revolution, deenergizing the step line 50. Relay 152 in the first subscriber's station is accordingly deenergized. During its period of energization the capacitor 161 was charged, through closed contacts 152–1, with positive potential from the source 160, whose negative terminal connects with conductor 136. With relay 152 deenergized therefore this charge, applied through a rectifier 162 energizes relay 156. Contacts 156–1 provide a holding circuit for this relay, energized from positive source 160 via the normally closed contacts 163–1 of a relay 163 whose coil is connected between the A.C. conductor 130 and the cueue release conductor 140.

The result of this operation is that the step line 50 from the central station to the first subscriber's station illustrated in FIG. 2 is extended via an outgoing step line 50′ from that subscriber's station to the incoming step line of the next subscriber's station. A record is made of the condition of its relay 126, as above described, and the recording then proceeds to the third subscriber's station, and so on. At the last one, there may be substituted for the outgoing step line a dummy load.

When all subscribers' stations have been interrogated to record the status of their relays 126, i.e. when the lamp 59′ goes out, the central station attendant operates read switch 51. This energizes the accept line grounding relay 58 and the cueue release relay 74. As soon as these relays deenergize, as they do automatically unless switch 51 is held operated (i.e. held in the position opposite to that shown in FIG. 1), the system returns to the "read" condition, with meter 53 indicating the fraction of the subscribers' stations whose relays 126 are energized. A new recording may be made if desired, the relays 126 remaining energized at stations where switch 108 has been operated until the standby switch 52 is opened. Normally it will not be opened until after the system switch 54 is open.

The embodiment illustrated includes in addition to the apparatus thus far described means to check periodically concordance of the tape advance with the identity of the subscribers' stations effecting punches of the tape. For billing purposes, among others, it is essential that each position length wise of the tape be positively identifiable with a particular subscriber's station. To this end, the control cable 21 includes an additional conductor 49 leading at the central station to the coil of a relay 80. When relay 80 is energized it energizes a conductor 81 operating another punch (not shown) which punches the record tape in a distinct "check" column. Control cable 21 includes a branch 149 led into every tenth subscriber's station, or into every twentieth, say, and there connects via normally open –9 contacts of relay 152 with the subscriber's station power source 158. These –9 contacts close upon energization of relay 152 by operation of the step conductor chain. A check punch is thus obtained from every tenth or twentieth subscriber's station. The identity of these check stations is known, and the check punch is made therefor whether the switch 108 at such stations is operated or not. It is therefore possible to determine whether the record tape is properly advanced from subscriber's station to subscriber's station.

The entire process of recording the response at one subscriber's station, with or without the additional facilities presently to be described, may take place in a fraction of a second, of the order of one-fifth of a second so that a record of response of all subscribers to a given program and/or set of questions may be had in a few minutes' time.

The embodiment illustrated includes in addition to the apparatus thus far described in detail, the two "question response" switches 110 and 112 at each subscriber's station which have been already mentioned and also apparatus to permit recording of answers by the subscribers to questions put to them over a television channel. Each subscriber's station includes a relay 166, whose coil is connected between the A.C. neutral conductor 130 and a "query" conductor 146 which extends back to the central station via a conductor 46 in cable 21. At the central station, conductor 46 is connectable to the opposite side 27 of the A.C. line 26 by closing of a query switch 72. With this switch closed, relay 166 is energized at all subscriber's stations, extending D.C. power from source 125 to but not through each of two relays 168 and 170. Consider for example a true false question put over the television channel (which can be done without energizing the band elimination filter) with instruction that the participants are to close switch 110 if the statement is true and switch 112 if it is false. The participants are those who operate their switches 108. A subscriber who thinks the statement is true will close 110 energizing relay 168 and illuminating lamp 116. The now closed contacts 168–1 provide a holding circuit for the relay and a circuit for lamp 116 between source 125 and the D.C. common conductor 136. Now closed contacts 168–3 place a resistor 171 as a load across a circuit energized from the central station and including the meter 76 and a calibrating resistor 77. Specifically, this circuit extends from conductor 31 through contacts 58–2 on relay 58, through meter 76, resistor 77, contacts 56–6 on relay 56, conductor 42 of cable 21 and into the subscriber's stations at branches 142. If the system is in "read" condition, with all relays 152 accordingly deenergized, meter 76 carries the sum of the currents drawn from central station source 29 at the resistor 171 in each subscriber's station where switches 108 and 110 have been operated, the branches 142 connecting to these resistors via closed –6 contacts on relays 152 and –3 contacts on energized relays 168.

For recording of the answers registered at switches 110, the –2 contacts of relay 168 connect the subscriber's station power source 160 through a current limiting the resistor 172 and the –5 contacts of relay 152 of each subscriber's station, as that station is interrogated upon the step line, to conductor 42 which now conveys the answer of the individual subscriber's station, in the form of an energized or deenergized condition of conductor 42, back to the central station. Here, the system now being in "record" condition, the conductor 42 leads through the now closed –5 contacts of relay 56 to a conductor 12 which permits energization of a relay 10 controlling conductor 9 which leads to a further punching solenoid (also not shown) whose punch is made in a distinct column of the record tape.

A circuit for the second query switch 112 and its central station punch solenoid controlling conductor 8 and meter 78 may be identical with that just described for the query switch 110. For switch 112 the cable 21 includes a conductor 44. Any number of such query switches and recording apparatus therefor may be provided. Energization of relay 58 grounds conductors 42 and 64 to discharge their capacity just as it does in the case of the accept conductor 38.

Figure 4:
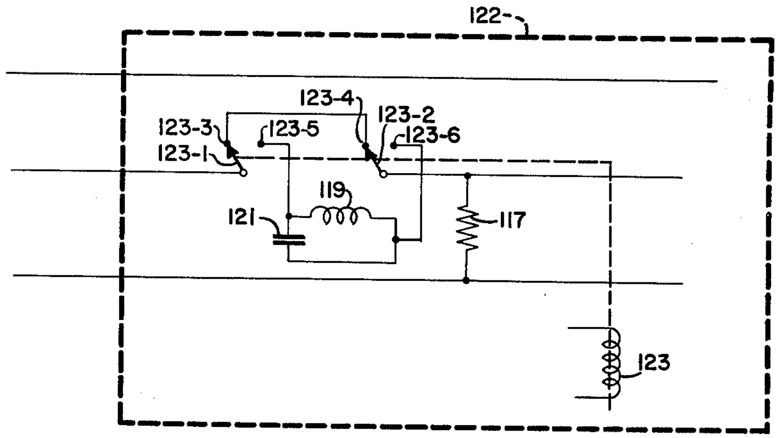
FIG. 4 is a diagram of a band elimination filter suitable for use in the invention.

One form of construction for the band elimination filter 122 is shown in FIG. 4. It comprises a section of the coaxial line 120 in which the center conductor is interrupted, connecting on opposite sides of the interruption to the movable contacts 123–1 and 123–2 of a relay 123. The –3 and –4 contacts of this relay with which the –1 and –2 contacts engage when the relay is deenergized are short-circuited together. The normally open –6 contact connectable with the –2 contact adjacent the central station (i.e. adjacent the junction of cable 120 with cable 20) leads through a parallel combination of inductor 119 and capacitor 121 to the normally open fixed contact 123–5 which is connectable with the –1 contact and thence with the center conductor of cable 120 leading to the receiver 102. A resistor 117 may be connected between the inner and outer conductors of the line 120 on the side of the interruption adjacent the central station. With relay 123 deenergized the line 120 is electrically continuous through the filter unit 122 whereas with that relay energized the line transmits poorly over a band of frequencies determined by the elements 119 and 121. These are selected to provide an attenuation of some 40 db within one television frequency channel. Other forms of selectively insertable and removable band elimination filters can of course be used in place of that shown in FIG. 4.

Figure 5:
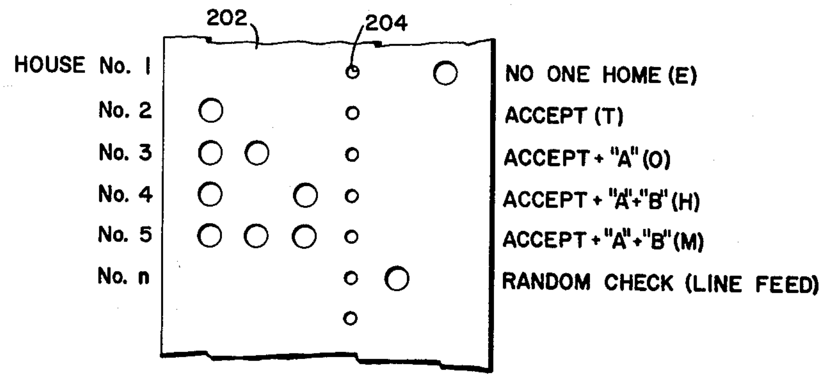
FIG. 5 is a representation of a record tape produced at the central station.

FIG. 5 is a representation of a fragment of the record tape made by tape punching apparatus in association with the system of the invention. In FIG. 5 there is shown a fragment of a paper tape 202 having a set of pre-punched longitudinally disposed perforations 204. Sprocket wheel mechanism forming part of the tape punching apparatus co-operates with the perforations 204 for advance of the tape. In FIG. 5 the tape is shown having five separate columns for information punches. While these may of course be assigned in any order, one possible arrangement assigns the first column at the left to the accept punch energized through relay 64 of FIG. 1 for subscriber's stations at which relay 126 is energized. The second and third columns are assigned to the punches energized via conductors 9 and 8 which record respectively operation of the subscriber's switches 110 and 112. The fourth column is assigned to the check punch energized from relay 80 by conductor 81 and which is provided at every tenth or twentieth subscriber's station. A fifth column is assigned to the non-accept punch energized via conductor 14 through relay 63.

Figure 3:
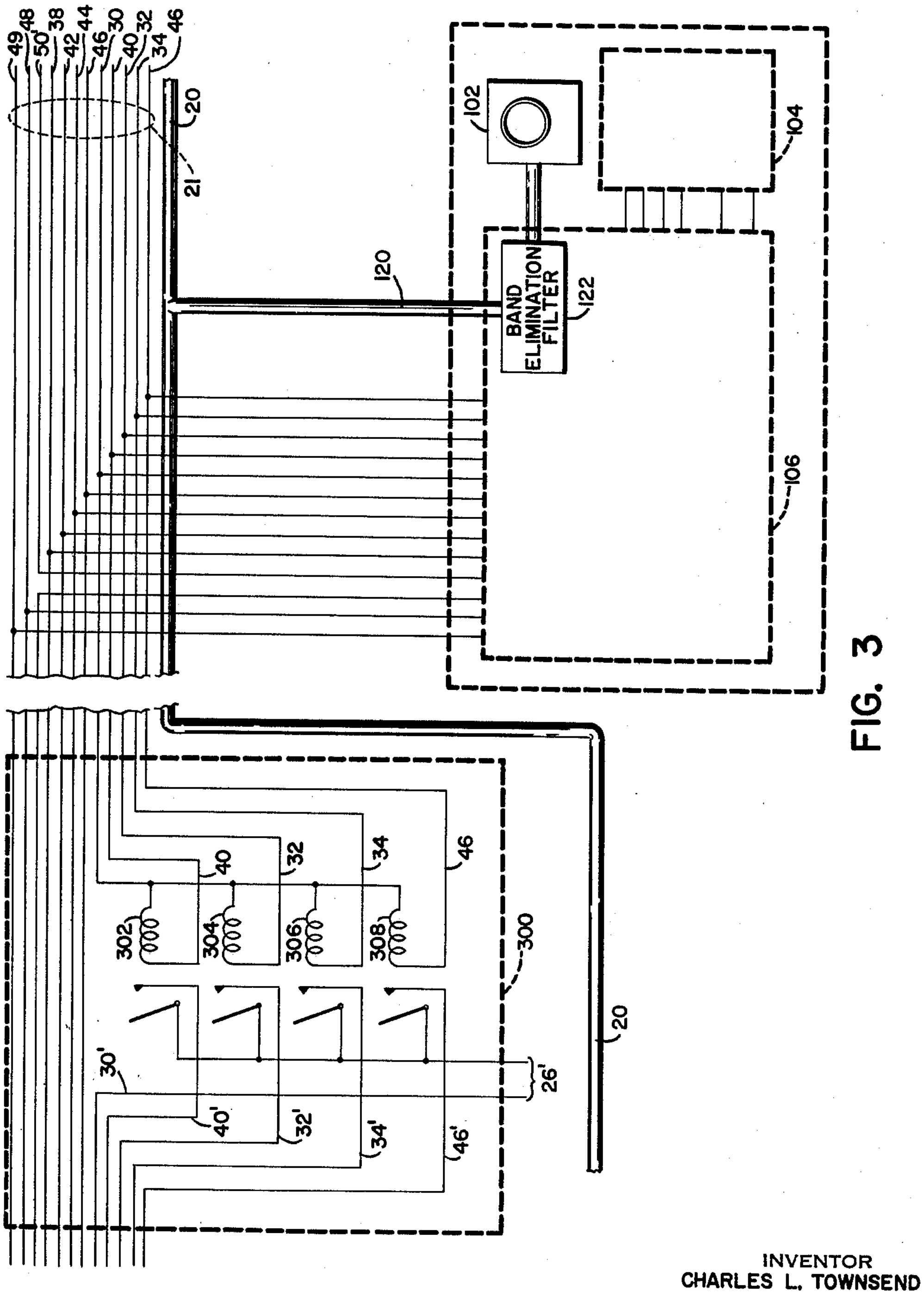
FIG. 3 is a diagram illustrating the connection of additional subscriber's stations to the installation and relay connections for periodic connection of the control conductors to a source of power.

In FIG. 3 the control cable 21 and the television signal transmission cable 20 are shown connected with a second subscriber's station 100. Beyond station 100 the cables 20 and 21 are broken to indicate the presence of additional subscriber's stations, and to the left of the break the control cable is shown entering a power repeat box 300. Within box 300 four relays 302, 304, 306 and 308 are provided, with their actuating coils connected between the A.C. neutral conductor 30 on the one hand and conductors 40, 32, 34 and 46 on the other hand respectively. These four conductors are connectable at the central station with the side 27 of the A.C. line 26 opposite neutral conductor 30 upon energization of relay 74 and upon closing of switches 52, 54 and 72 respectively. The relays 302, 304, 306 and 308 serve respectively to energize continuations 40', 32', 34' and 46' of conductors 40, 32, 34 and 46 from an A.C. line 26', of which one side 30' constitutes a continuation of the neutral conductor 30.

From the foregoing description it will be apparent that applicant has provided a signal distribution system comprising a central station, a plurality of subscriber's stations, a source 17 of signals at the central station, and a transmission line 20, 120 for those signals extending from the central station to each of the subscriber's stations. The system may further comprise, in conductor 38 and its branches 138 with the return conductor 36 and its branches 136, means defining a first system signal channel extending from each of said subscriber's stations to said central station. In the step conductor 50 with its extensions 50', 50'', etc. and in the step return conductor 48 with its branches 148, the system comprises means defining a second system channel extending from the central station to one of the subscriber's stations and extensible at each of the subscriber's stations to another of subscriber's stations so as to extend finally through all of the subscriber's stations in series.

In certain of its embodiments, the system of the invention may omit the band elimination filter and the apparatus for instantaneously indicating at the central station the proportion of subscriber's stations giving a response at their switches 110 and 112, and at their accept switches 108. In such simplified embodiments, the contacts of relays 168, 152 and 156 constitute first, second and third two-position switching means, actuated by the coils of those relays respectively, and the reply conductor 42, 142 with return conductor 36, 136 constitutes the first system signal channel above referred to. The conductor 103 between the fixed –5 contact on relay 156 and the movable –2 contact on relay 168 constitutes, together with the D.C. common conductor 136 within each subscriber's station, a channel individual to that station. In deenergized and energized conditions respectively relay 168 connects this channel to two discriminable power sources, one provided by power supply 160 through resistor 172 when relay 168 is energized, and the other, of zero volts, provided when the channel of conductor 103 is open-circuited at relay 168. In deenergized and energized conditions relay 152 respectively disconnects the channel of conductor 103 from, and connects it to the system signal channel of the reply conductor 42, 142 and return conductor 36, 136.

The connection of the channel of conductor 103 to channel 42, 142 by relay 152 is made and then broken for one subscriber's station after another by the energization of the step line 50 and its extensions. Each subscriber's station is, by operation of capacitor 161 and associated elements, responsive to the application and subsequent removal of a signal through the system signal channel provided by the step line, to shift relay 152 to the position in which channel 103 is connected to channel 42, 142 and to shift it back again. When relay 152 is so shifted back the third switching means constituted by relay 156 shifts from its first position in which the step channel energizes relay 152 to a second position in which the step channel is extended through the subscriber's station under consideration and into the next.

A more elaborate embodiment of the invention, still falling short of that which has been described herein in detail, includes in each subscriber's station at the conductor 105 between the –3 contacts of relay 168 and the –6 contacts on relay 152, together with the ground provided by conductor 136, a first channel individual to the subscriber's station while the channel of conductor 103 is a second channel individual to the subscriber's station.

In contrast to the channel of conductor 103, the channel of conductor 105 is connected to the system channel 42, 142, 36, 136 when relay 152 is deenergized. In resistor 171 when relay 168 is energized and in the infinite resistance presented at the –3 contacts of relay 168 when it is deenergized, the subscriber's station includes two passive loads (the second of zero value) selectively connectable across this first channel by operation of relay 168 under control of switch 110. The central station in an embodiment of the invention including for each subscriber's station this first channel will include not only the recording means (relay 10 and its punch, not shown) connected to the system signal channel provided by conductor 42 for recording of the voltage sources connected to the channel of conductor 103, but also (at the central station) a voltage source and current measuring device (meter 76) in series which are connectable in place of the recording device across the channel of conductor 42 at the central station. The recording device at the central station records the signal applied to the channel of conductor 42 by the source connected to subscriber's station channel 103 each time the central station applies to the signal channel of the step conductor a signal causing energization of the relay 152 at one subscriber's station. The current measuring device measures the aggregate of the passive loads coupled to the channel 42 at all sub subscriber's stations when relays 152 are deenergized.

In the preferred embodiment of the invention illustrated, there is included in the subscriber's station at filter 122 and relay 123 means operable from the central station to block the passage of television signals through the transmission line 120 at that station. The –6 contacts on relay 126 provide means to disable that blocking means, and the contacts of that relay generally become the first switching means of the subscriber's station, operable under control of switch 108. In such a preferred embodiment the first system signal channel is provided by accept conductor 38, its branches, and return conductor 136 with its branches. The first and second channels individual to the subscriber's station are then associated with conductors 109 and 107, the first of which extends between the –8 contacts of relay 152 and the –5 contacts of relay 126, and the second of which extends between the –7 contacts of relay 152 and the movable element of contacts 126–3 and 126–4 in relay 126.

The preferred embodiment of the invention therefore provides for operation of the first switching means (relay 126) to disable the blocking means. It also provides at the individual subscriber's station channel 109 and at a first system channel associated with the accept conductor 138 means whereby the aggregate of the passive loads constituted by resistors 154 and the zero load at open circuited contacts 126–5 in stations not accepting the program may be measured at the central station. In addition it provides at the subscriber's station channel associated with conductor 107 and in conjunction with the system signal channel of the conductor 138 means whereby for each subscriber's station a record may be made at the central station of which of two discriminable power sources is coupled to the channel of conductor 107 under control of the switching means provided by relay 126. In the embodiment illustrated, these discriminable power sources are the positive and negative power supplies 160 and 158 at the subscriber's station, which are connected respectively to the stationary contact of contact pair 126–4 and to the stationary contact of contact pair 126–3.

In the foregoing paragraphs certain properties of the invention have been set forth. The scope of the invention is however set forth in the appended claims, and is in particular not limited to the particular embodiments which have been described.

I claim:

1. A signal distribution system comprising a central station, a plurality of subscriber's stations, a source of signals at the central station, a transmission line for said signals extending from said central station and having a branch extending to each of said subscriber's stations, signal blocking means removably insertable into each of said branches, separate means at each subscriber's station operable together from said central station for inserting said blocking means, separate means at each subscriber's station to disable said inserting means, means at each subscriber's station for producing an indication of the condition of said disabling means at such station, means at said central station for recording the condition of said disabling means at each of said subscriber's stations, a system signal channel extending from said central station to one of said subscriber's stations and extensible at each of said subscriber's stations to another of said subscriber's stations, means for extending said system signal channel to said subscriber's stations in sequence, and means at each said subscriber's station responsive to extension of said signal channel thereto for coupling said indication producing means at each subscriber's station to said recording means at said central station.

2. A signal distribution system comprising a central station, a plurality of subscriber's stations, a source of signals at the central station, a transmission line for said signals extending from said central station to each of said subscriber's stations, means defining a first system signal channel extending from each of said subscriber's stations to said central station, means defining a second system channel extending from said central station to one of said subscriber's stations and extensible at each of said subscriber's stations to another of said subscriber's stations to extend through all of said subscriber's stations in series, each of said subscriber's stations comprising first, second and third two-position switching means, actuating means for each of said switching means, a signal channel individual to such subscriber's station, two discriminable signal sources, said first switching means in first and second positions connecting said individual channel to one and the other of said sources, said second switching means in first and second positions disconnecting and connecting said first system signal channel with said individual channel respectively, said third switching means in first and second positions connecting said second system signal channel to the actuating means of said second switching means to shift the same from first to second position and extending said second system signal channel to another of said subscriber's stations respectively, each of said subscriber's stations having means responsive to the application and removal of a signal to said second system signal channel to shift said third switching means from first to second position, said central station including means cyclically to apply a signal to said second system signal channel and to record for each of said last named signals the signal applied to said first system signal channel by the discriminable sources at the subscriber's station at which the last signal applied to said second system signal channel reached the actuating means of the second switching means.

3. A signal distribution system according to claim 2 including a third system signal channel extending from the central station to each of said subscriber's stations, and means at each of said subscriber's stations responsive to the application of a signal to said third system signal channel to restore the third switching means at all subscriber's stations to first position.

4. A signal distribution system comprising a central station, a plurality of subscriber's stations, a source of signals at the central station, a transmission line for said signals extending from said central station to each of said subscriber's stations, means defining a first system signal channel extending from each of said subscriber's stations to said central station, means defining a second system channel extending from said central station to one of said subscriber's stations and extensible at each of said subscriber's stations to another of said subscriber's stations to extend through all of said subscriber's stations in series, each of said subscriber's stations comprising first, second and third two-position switching means, actuating means for each of said switching means, two signal channels individual to such subscriber's station, two passive loads and two discriminable signal sources, said first switching means in first and second positions connecting said first individual channel to one and the other of said passive loads respectively and connecting said second individual channel to one and the other of said sources respectively, said second switching means in first and second positions connecting said first system signal channel to said first and second individual channels respectively, said third switching means in first and second positions connecting said second system signal channel to the actuating means of said second switching means to shift the same from first to second position and extending said second system signal channel to another of said subscriber's stations respectively, each of said subscriber's stations having means responsive to the application and removal of a signal to said second system signal channel to shift said third switching means from first to second position, said central station including means to measure the aggregate of the passive loads applied at said subscriber's stations to the first of said individual channels at all of said subscriber's stations with said second switching means in first position, and means cyclically to apply a signal to said second system signal channel and to record for each of said last named signals the signal applied to said first system signal channel by the discriminable sources at the subscriber's station at which the last signal applied to said second system signal channel reached the actuating means of the second switching means.

5. A signal distribution system comprising a central station, a plurality of subscriber's stations, a source of signals at the central station, a transmission line for said signals extending from said central station to each of said subscriber's stations, means defining a first system signal channel extending from each of said subscriber's stations to said central station, means defining a second system channel extending from said central station to one of said subscriber's stations and extensible at each of said subscriber's stations to another of said subscriber's stations to extend through all of said subscriber's stations in series each of said subscriber's stations comprising means operable from said central station to block the passage of said signals through said transmission line to such subscriber's station, means to disable said blocking means, first, second and third two-position switching means, actuating means for each of said switching means, a signal channel individual to such subscriber's station, two discriminable signal sources, said first switching means in first and second positions actuating and deactuating said disabling means respectively and connecting said individual channel to one and the other of said sources respectively, said second switching means in first and second positions disconnecting and connecting said first system signal channel with said individual channel respectively, said third switching means in first and second positions connecting said second system signal channel to the actuating means of said second switching means to shift the same from first to second position and extending said second system signal channel to another of said subscriber's stations respectively, each of said subscriber's stations having means responsive to the application and removal of a signal to said second system signal channel to shift said third switching means from first to second position, said central station including means cyclically to apply a signal to said second system signal channel and to record for each of said last named signals the signal applied to said first system signal channel by the discriminable sources at the subscriber's station at which the last signal applied to said second system signal channel reached the actuating means of the second switching means.

6. A signal distribution system comprising a central station, a plurality of subscriber's stations, a source of signals at the central station, a transmission line for said signals extending from said central station to each of said subscriber's stations, means defining a first system signal channel extending from each of said subscriber's stations to said central station, means defining a second system channel extending from said central station to one of said subscriber's stations and extensible at each of said subscriber's stations to another of said subscriber's stations to extend through all of said subscriber's stations in series, each of said subscriber's stations comprising means operable from said central station to block the passage of said signals through said transmission line to such subscriber's station, means to disable said blocking means, first, second and third two-position switching means, actuating means for each of said switching means, two signal channels individual to such subscriber's station, two passive loads and two discriminable signal sources, said first switching means in first and second positions actuating and deactuating said disabling means respectively and connecting said first individual channel to one and the other of said passive loads respectively and connecting said second individual channel to one and the other of said sources respectively, said second switching means in first and second positions connecting said first system signal channel to said first and second individual channels respectively, said third switching means in first and second positions connecting said second system signal channel to the actuating means of said second switching means to shift the same from first to second position and extending said second system signal channel to another of said subscriber's stations respectively, each of said subscriber's stations having means responsive to the application and removal of a signal to said second system signal channel to shift said third switching means from first to second position, said central station including means to measure the aggregate of the passive loads applied at said subscriber's stations to the first of said individual channels at all of said subscriber's stations with said second switching means in first position, and means cyclically to apply a signal to said second system signal channel and to record for each of said last named signals the signal applied to said first system signal channel by the discriminable sources at the subscriber's station at which the last signal applied to said second system signal channel reached the actuating means of the second switching means.

7. A signal distribution system according to claim 6 wherein the central station includes a voltage source and current measuring means in series, and two-position switching means, said last named switching means in a first position coupling said voltage source and current measuring means to said first system signal channel and, in second position coupling said first system signal channel to said recording means.

References Cited by the Examiner

UNITED STATES PATENTS

| | | | |
|---|---|---|---|
| 2,918,522 | 12/59 | Ridenour | 178—5.1 |
| 2,996,580 | 8/61 | Reid | 235—52 |
| 3,050,712 | 8/62 | Bruck | 178—5.1 |

DAVID G. REDINBAUGH, *Primary Examiner.*

E. JAMES SAX, *Examiner.*